A. F. POOLE.
SPEEDOMETER.
APPLICATION FILED MAY 5, 1917.
1,351,585.
Patented Aug. 31, 1920.
2 SHEETS—SHEET 1.
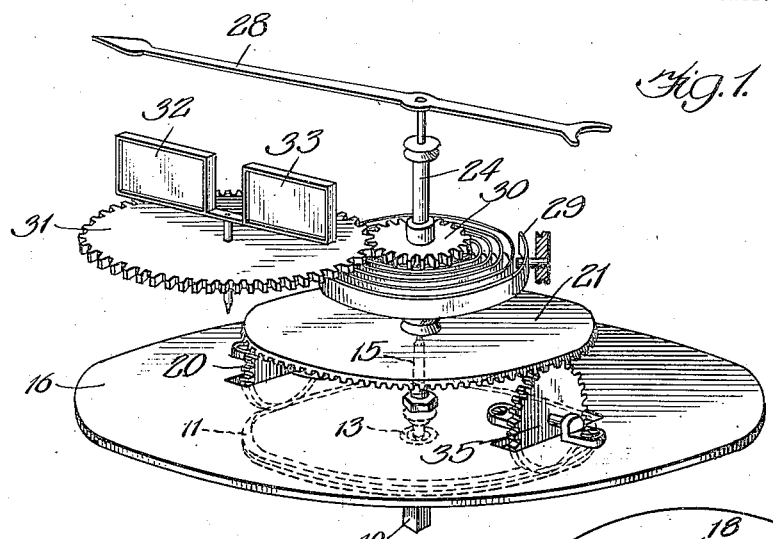
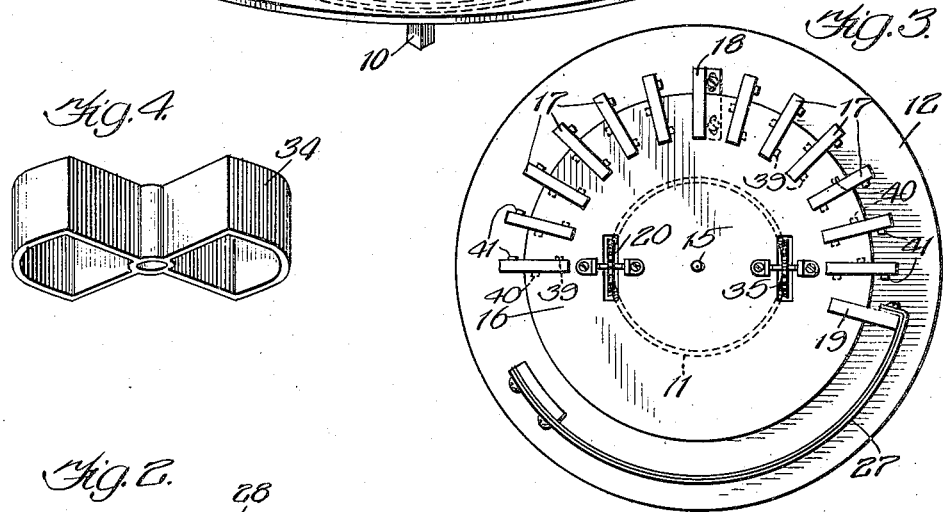

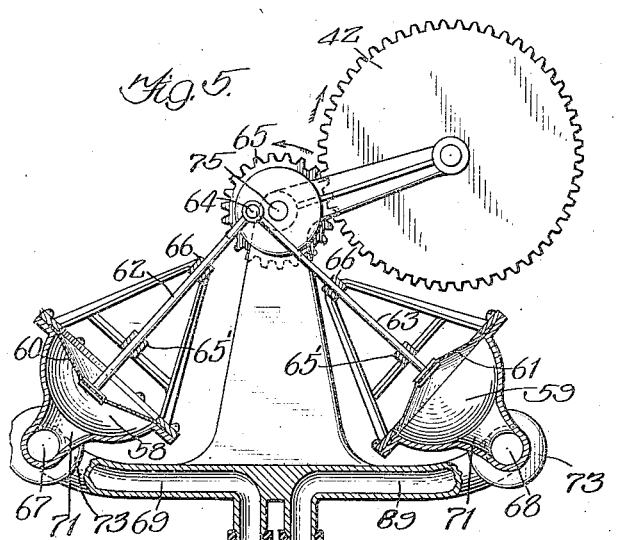
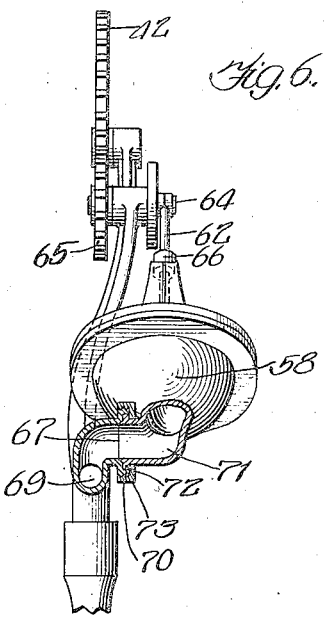
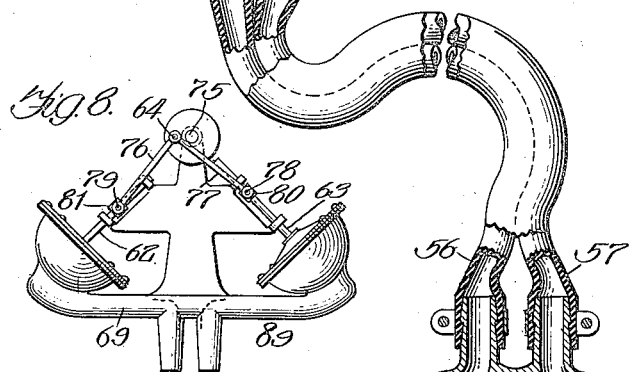
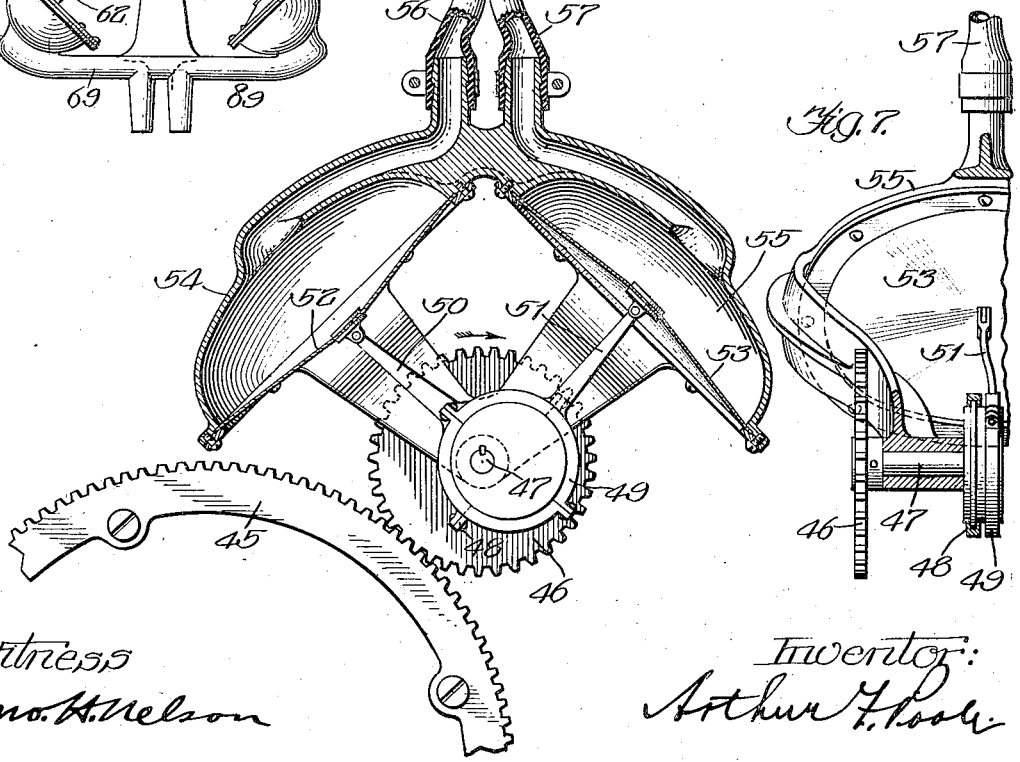

UNITED STATES PATENT OFFICE.

ARTHUR F. POOLE, OF CHICAGO, ILLINOIS.

SPEEDOMETER.

1,351,585.  Specification of Letters Patent.  Patented Aug. 31, 1920.

Application filed May 5, 1917. Serial No. 166,613.

*To all whom it may concern:*

Be it known that I, ARTHUR F. POOLE, a citizen of the United States, residing at Chicago, in the county of Cook and State of Illinois, have invented certain new and useful Improvements in Speedometers, of which the following is a specification.

My invention is a magnetic speedometer designed primarily for use with automobiles, and an improved method of connecting the same to the running gear of the automobile.

The object of my invention is to dispense with the usual flexible shaft which serves to transmit the motion of the automobile to the speedometer head, and to also improve the structure and operation of the speedometer head itself.

My invention may be best understood by reference to the accompanying drawings of which:

Figure 1 is a perspective view of part of the mechanism in the speedometer head.

Fig. 2 is a section of the same.

Fig. 3 is a plan view of the peculiar magnetic field employed.

Fig. 4 is a detail of a part of the damping device.

Fig. 5 is a view, more or less diagrammatic, showing the pneumatic transmission connecting the automobile running gear with the speedometer head.

Fig. 6 is a side view of the upper part of Fig. 5, and

Fig. 7 is a side view of the lower part of Fig. 5.

I shall first describe the speed indicating mechanism *per se*. This is located in the speedometer head which, as usual, is intended to be mounted on the dash board of the vehicle. The head is connected to the front wheel by my improved method of pneumatic transmission.

Referring particularly to Figs. 1 and 2, a gear 42 is mounted on a shaft 10, which is rotatively mounted in the framework 12 of the speedometer head. This gear 42 is rotated by means hereinafter to be described at a speed proportional to the speed of the vehicle on which the speedometer is used. On the upper end of the shaft 10 is a bevel gear 11, meshing in which are two bevel gears 20 and 35, which are rotatively mounted on a disk 16 rigid on a shaft 15, which has one end running in the jewels 13 and 14 mounted in the gear 11, and the other end running in the jewels 22 and 23, mounted in a bevel gear 21 of the same size as the bevel gear 11. The system consisting of the bevel gears 11 and 21 and the meshing bevels 20 and 35 forms therefore what is ordinarily known as a differential gear. The disk 16 which, as before noted, is mounted on the shaft 15, is made of electrically conducting material, such for instance as aluminum, and is so placed that it turns in the field of a plurality of permanent magnets 17, 18 and 19 (Fig. 3). The bevel gear 21 is rigid to a shaft 24 which at its lower end turns in a ball bearing 25 in the framework 12. The upper end of the shaft 24 has a bearing in a ball bearing 26 also mounted in the framework 12. On the extreme upper end of the shaft 24 is an indicating hand or pointer 28, which moves over a suitably graduated dial (not shown).

A spiral spring 29 has one end attached to a bracket mounted on the framework 12 and the other end attached to the shaft 24. On the shaft 24 is rigidly mounted a gear 30 which meshes in a gear 31 mounted on a shaft 43 which has its lower bearing in the framework 12 and its upper bearing in a cap 44 which serves to close a damping chamber 34 mounted on the framework 12. Attached to the shaft 43 and moving in the damping chambers are two damping vanes 32 and 33. These vanes are of such a size that they almost fill the cross section of the damping chamber 34 but do not touch the sides thereof. Obviously a sudden motion of the shaft 43 and the shaft 24 geared thereto will be resisted.

I shall now describe the operation of my improved speed indicating mechanism.

When a gear 42 is turned in the direction of the arrow it tends to turn the conducting disk 16 and also the bevel gear 21. The motion of the conducting disk 16 through the field of the permanent magnets is resisted by the eddy currents induced in said disk. Consequently this torque is communicated through the bevel gears 20 and 35 and the bevel gear 21 to the spring 29, which is wound up until the tension of this spring as modified by the gear ratio of the differential system just balances the torque due to the motion of the conducting disk 16 through the field of the permanent magnets. Assuming the speed of the gear 42 to remain constant, the entire system up to and including the hand 28 is then in equilibrium, and the tension of the spring 29 as measured by the deflection of the hand 28 is proportional to the speed of the gear 42.

It will be recognized that I have in a manner reversed the magnetic speedometer of the prior art. Instead of having the magnetic field movable and the conducting disk connected by a spring to the framework, I make the magnetic field stationary, rotate the conducting disk through said field, and measure the torque necessary to produce such rotation.

I shall now point out some of the advantages which follow from this reversal. Owing to the fact of the magnetic field being stationary with the framing of the speedometer, I can use a comparatively large number of small magnets, thereby obtaining not only a more intense magnetic field, but a magnetic field which will remain more nearly permanent with age. Furthermore, by distributing this magnetic field over a large part of the circumference of the conducting disk, I am enabled to get a more powerful retarding effect than would be obtained by the same number of magnetic lines of force concentrated in one point.

Another great advantage which I gain is the ability to make the moving parts of my system extremely light. The scale of the gears as shown in Fig. 2 is much larger than their actual size, and thus the wear on the moving parts of the speedometer is reduced to a minimum.

Owing to the great intensity of the magnetic field which I am able to obtain in my herein disclosed invention, the motion of the shaft 10 can be much slower than any magnetic speedometer heretofore constructed, since I not only am enabled to use a plurality of magnets, but reference to Fig. 2 will show that I am enabled to have the disk 16 cut the lines of force in a perpendicular direction, and thus to cut practically all of the lines of force which are due to any of the permanent magnets 17. From this construction there results both a greater ratio of torque to speed and torque to weight of moving parts than is obtainable in magnetic speedometers of the prior art.

In case there is a sudden acceleration or deceleration of the shaft 10, the consequent motion of the hand will be resisted by the damping vanes 32 and 33 with the result that most of the speed variation will be transmitted to the rotating disk 16. This damping device is useful in preventing sudden excursions of the hand 28, and it is obvious that it is simply a matter of so proportioning the area of the vanes 32 and 33, and the clearance between said vanes and the chamber 34, to get any desired degree of damping of the hand 28. By the provision of a damping vane on the hand 28 I am enabled to avoid sudden jerks of said hand, due to a sudden motion either of the vehicle itself or the flexible shaft.

Reference to Fig. 3 will disclose that one of the magnets 18 is fastened to the frame 12 by means of screws which pass through elongated slots of said magnet. This is for the purpose of calibrating the instrument, since by moving the magnet 18 toward the center of the disk its retarding effect is diminished, and moving it toward the circumference has the contrary effect. It is obvious that if a sufficient range of calibration cannot be obtained by a single magnet 18 others may be made adjustable also.

The permanent magnet 19 is mounted on the end of a bimetallic bar 27 for the purpose of affording a compensation for temperature changes. The bar 27 is so arranged that when the temperature rises said bar moves the magnet 19 toward the circumference of the disk 16 and in the contrary direction when the temperature falls. This will compensate for the change in torque of the magnets 17 and 18 due to a variation of the electrical resistance of the disk 16 resulting from a change of temperature.

The permanent magnets 17 are fastened to the frame by means of lugs 39, 40 and 41 (Figs. 2 and 3), these lugs being thrown up from the framing 12 and bent or swaged up out of the disk 12 and then bent through holes 36, 37 and 38 in the permanent magnets 17, thus making a simple and inexpensive means of supporting these magnets.

I shall now describe the means by which the gear 42 is made to rotate at a speed proportional to the speed of the moving vehicle. Referring to Fig. 5, 45 is a gear fastened to the front wheel of the automobile. Into this gear meshes a gear 46 rotatively mounted on a shaft in the framework of the machine. Rigid with the gear 47 are two eccentrics 48 and 49, fastened to the straps of which are pitmen 50 and 51. These pitmen are pivoted to flexible diaphragms 52 and 53, which serve to close air chambers 54 and 55. Rotation of the gear 45 will oscillate the diaphragms 52 and 53 producing alternate compressions and rarefactions in the air contained in the chambers 54 and 55. Since these chambers are placed at an angle of 90 degrees with each other, the pneumatic pulsations due to the motion of the diaphragms will be 90 degrees displaced in phase. Leading from the air chambers 54 and 55 are two tubes 56 and 47, which are connected to air chambers 58 and 59 mounted in the framing of the speedometer head. The chambers 58 and 59 are closed by diaphragms 60 and 61, and to these diaphragms are connected pitmen 62 and 63. These pitmen, which are in different places, are connected to a common crank pin 64, mounted on a gear 65 rotatively mounted in the framework of the speedometer head, and which gears into the gear 42 on the shaft 10. Suitable guides 65 and 66 are provided for the pitman 62, and the entire chamber 58 is pivoted on the framing of the speedometer head at 67, the connection being such that the continuity of the air passage in the tube 56 is maintained. In a similar manner the air chamber 59 is pivoted on the speedometer framing at 68, and this connection is also such that the continuity of the air passage 57 is maintained. The system, consisting of the two pitmen with their oscillating diaphragms, constitutes a means of rotating the wheel 65, and since these two pitmen are placed at right angles to each other, it is obvious that there will exist no dead centers on the wheel 65, since one or the other of the pitmen 62 or 63 will always be in a position to furnish a turning moment on said gear 65.

I wish to call attention to the fact that the system consisting of the lower chambers 54 and 55 and the upper chambers 58 and 59 coöperating therewith forms a mechanism which is somewhat analogous to a polyphase electric generator furnishing current to a two phase synchronous motor, and that the gear 65 will be rotated at exactly the same rate as the gear 46.

The air chambers 54 and 55 are made considerably larger than the connecting chambers 58 and 59 with the view of providing against leakage, since all that is required to turn the gear 65 is that an alternating pressure be exerted in the diaphragms 60 and 61 and that these pressures be displaced in phase.

In the previous description, for the sake of clearness, I have not gone into the details of the connections permitting the oscillation of the air chambers 58 and 59. Reference to Fig. 6 will show that the air pipe 69 is provided with a shoulder 70, and the pipe 71 leading to the lower part of the chamber 58 is provided with a flange 72. The shoulder 70 has a screw thread cut on it, and on this thread is screwed a union coupling 73. This permits an oscillation of the entire air chamber 58 and the pitman 62 mounted slidably thereon about the pipe 69, which as before noted is rigid with the framing of the speedometer head.

This improved method of transmission has many advantages over the flexible shaft ordinarily employed. One marked advantage is that of cheapness, since the mechanism at the wheel end is very little more than the mountings usually required to support the gear and swivel joint. The connecting tubing, which may be either of rubber or some flexible metal such as copper, is of course much cheaper than the flexible chain. In addition to the advantages of cheapness it also is much more certain of operation, since one has to maintain not a whole chain, but simply a mechanism at the front wheel and another mechanism at the speedometer head, the connection between the two being made simply by air tubes. Another advantage of my construction over the flexible shaft is the absence of noise.

It will be observed that the volume of air contained in the chamber 54, the tube 56 and the chamber 58 is a constant, and that this air is pumped backward and forward through the tube. No additional air need be taken in from the outside, and therefore troubles due to dust and moisture are avoided. Of course the air chambers 54 and 58 and their associated diaphragms might be replaced by cylinder and piston movements and the function remain the same. However, I prefer the diaphragms as shown, since they are more readily kept in working condition.

This improved method of transmission is especially advantageous when employed in connection with my improved head, since as before noted the movement of inertia of the moving parts of the head may be made extremely small, and it is this feature that makes it well adapted to be driven by my improved pneumatic transmission.

I have shown no odometer in connection with this head, since an odometer is very well known in the art, and it forms no part of my present invention. In practice the odometer would be geared to the shaft 10, since the number of revolutions of this shaft is proportional to the number of revolutions of the gear 45 attached to the front wheel of the automobile, and therefore proportional to the distance traveled.

An advantageous use of the herein described method of transmission is to attach the shaft 75 by means of a spring directly to the rotating element of a magnetic speedometer of the ordinary type. The shaft 75 could be attached to such a speedometer directly if one wished to put up with a certain amount of irregularity in the indicating means. However, if a helical spring were introduced between the shaft 75 and the driving shaft of the usual speedometer head, these irregularities would be smoothed out somewhat in the same manner as that described in a certain one of my co-pending applications on speedometers.

While I prefer the form of speedometer head shown in this application, yet the herein described pneumatic transmission is by no means limited to the actuation of my herein described speedometer head. It may be used to advantage with any of the existing forms of speedometer heads now on the market, especially when there is a spring interposed between the shaft 75 and the driving shaft of the speedometer head, this spring, as before noted, being inserted for the purpose of equalizing any irregularities in the rotation of the shaft 75.

Many changes and variations may be made in my improved device as herein described without departing from the spirit of my invention, since I claim:

1. In an automobile speedometer, the combination of means for producing polyphase pneumatic impulses, means for translating said impulses into a rotary motion, and means to measure said rotary motion.

2. In an automobile speedometer, the combination of means for producing polyphase pneumatic impulse, means for translating said impulses into a rotary motion, and magnetic means to measure said rotary motion.

3. In an automobile speedometer, the combination of means for producing a series of air pulsations proportional to the speed to be measured, and second means for producing a series of pulsations proportional to the speed to be measured, said second means being displaced in phase relative to said first means, means for translating said pneumatic impulses into a rotary motion, and means for measuring said rotary motion.

4. In an automobile speedometer, the combination of pneumatic means displaced in phase for producing rotation proportional to the speed to be measured, means for magnetically retarding said rotation, and means for measuring the torque necessary to overcome said magnetic retarding means.

5. In an automobile speedometer, the combination of a framework, an element rotating proportional to the speed to be measured, pneumatic means adapted to rotate said element proportional to the speed to be measured, means to establish a magnetic field mounted on said framework, means for rotating a conducting element in said magnetic field proportional to the speed to be measured, and means for measuring the torque necessary to rotate said conducting element.

6. In an automobile speedometer, a differential gear, one element of which is driven proportional to the speed to be measured, pneumatic means adapted to drive said element, a second element of which rotates in a stationary magnetic field, and the third element of which is rotated against a spring tension proportional to the retardation produced by said magnetic field on said second element.

7. In an automobile speedometer, the combination of a differential gear, one element of which is driven proportional to the speed to be measured, pneumatic means adapted to drive said element, a second element of which rotates in a stationary magnetic field, the third element of which is rotated against a spring tension proportional to the retardation produced by said magnetic field on said second element, and damping means operating in connection with said third element to prevent sudden vibrations thereof.

8. In an automobile speedometer, a differential gear having three elements, the lower element being rotated proportional to the speed to be measured, pneumatic means adapted to drive said lower element, the center element including a conducting disk which is adapted to be rotated in a stationary magnetic field, and a third element including an indicating hand and a spring tension and adapted to be dragged by said second element against said spring tension.

9. In an automobile speedometer, the combination of a framework, an element rotating proportional to the speed to be measured, pneumatic reponsive means displaced in phase adapted to rotate said element proportonal to the speed to be measured, means for establishing a magnetic field mounted on the framework, means for rotating a conducting element in said magnetic field proportional to the speed to be measured, and means for measuring the torque necessary to rotate said conducting element.

10. In an automobile speedometer, a differential gear, one element of which is driven proportional to the speed to be measured, pneumatic responsive means displaced in phase adapted to drive said element, a second element of which rotates in a stationary magnetic field, and the third element of which is rotated against a spring tension proportional to the retardation produced by said magnetic field on said second element.

11. In an automobile speedometer, the combination of a differential gear, one element of which is driven proportional to the speed to be measured, pneumatic responsive means displaced in phase adapted to drive said element, a second element of which rotates in a stationary magnetic field, the third element of which is rotated against a spring tension proportional to the retardation produced by said magnetic field on said second element, and damping means operating in connection with said third element to prevent sudden vibrations thereof.

12. In an automobile speedometer, a differential gear having three elements, the lower element being rotated proportional to the speed to be measured, pneumatic responsive means displaced in phase adapted to drive said lower element, the center element including a conducting disk which is adapted to be rotated in a stationary magnetic field, and a third element including an indicating hand and a spring tension and adapted to be dragged by said second element against said spring tension.

In witness whereof I have hereunto signed my name this 3rd day of May, 1917.

ARTHUR F. POOLE.